Dec. 6, 1949     W. L. BURKE     2,490,669
ILLUMINATED BOBBER
Filed April 8, 1947
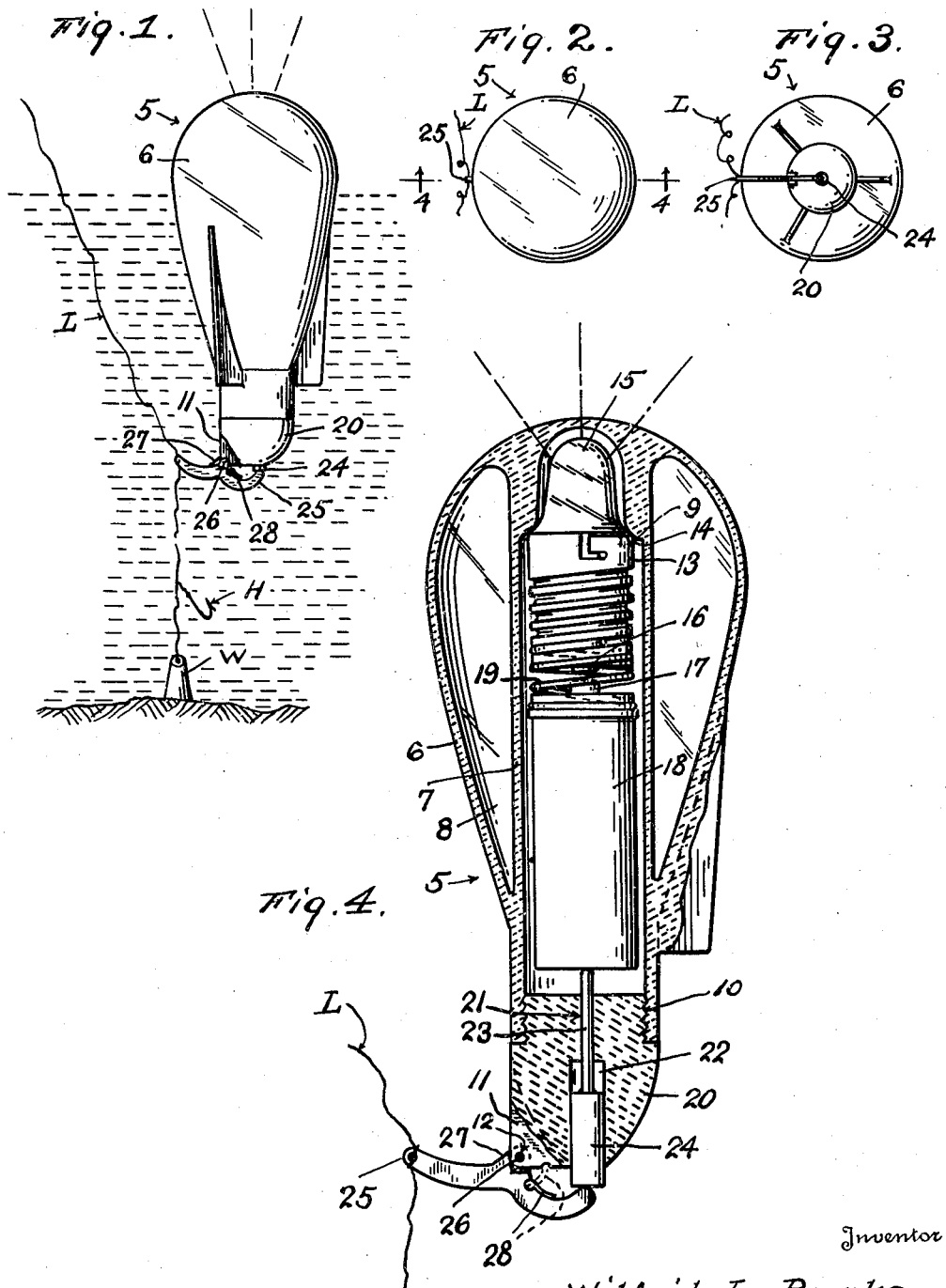
Inventor
Wilfrid L. Burke
By L. B. James
Attorney Patented Dec. 6, 1949

2,490,669

UNITED STATES PATENT OFFICE 2,490,669

ILLUMINATED BOBBER

Wilfrid L. Burke, Detroit, Mich.

Application April 8, 1947, Serial No. 740,139

1 Claim. (Cl. 43—17)

This invention relates to the official class of fishing and trapping and more particularly illuminated fishing bobbers.

The primary object of this invention resides in the provision of a fishing bobber adapted to be used either in the day or night to signal the fisherman when a fish is caught on the hook or his fishing line.

Another object of this invention resides in the provision of an illuminated fishing bobber adapted to be lighted by a fish caught on the fishing line attached thereto.

A further object of this invention resides in the provision of an illuminated fishing bobber having an electric circuit adapted to be cut off to prevent illumination thereof at the option of the fisherman.

A still further object of this invention resides in the particular construction of the body of the bobber.

Aside from the aforesaid objects, this invention resides in the particular construction of the illuminating means of the bobber.

In addition to the foregoing objects, this invention resides in the particular construction of the trigger.

One of the salient features of this invention resides in the combination of the illuminating means of the bobber and circuit operating means thereof.

With these and other objects in view, this invention resides in certain novel features of construction and arrangement of elements to be hereinafter more particularly set forth in the specification, illustrated in the accompanying drawing and pointed out in the appended claim and, while this disclosure depicts my present conception of the invention the right is reserved to resort to such changes in construction and arrangement of elements as come within the spirit of the invention.

In the accompanying drawing forming a part of this application:

Fig. 1 is a side view of the bobber.

Fig. 2 is a plan view thereof.

Fig. 3 is a bottom view of the bobber.

Fig. 4 is an enlarged vertical sectional view of the bobber taken approximately on line 4—4 of Fig. 2.

In the present illustration of this invention the numeral 5 designates, in general, a fishing bobber preferably constructed of transparent or translucent plastic material in the form of a substantially egg-shape body portion 6 having a sleeve 7 formed therein in spaced relation to the inner sides thereof to form an air tight compartment 8 therearound and thereby provide the necessary buoyancy to float the bobber and elements carried thereby.

Formed adjacent the upper end of the sleeve is an annular shoulder 9 while disposed at its lower open end are internal threads 10.

Integrally or otherwise formed on the outer lower portion of the body of the bobber is a fin 11 having an aperture 12 therein and although but one fin is herein shown, one or more of them may be disposed around the bobber to balance the same and also limit its tendency to spin in the water.

Removably disposed in the upper portion of the sleeve 7 is a bulb socket 13 having an annular upper edge 14 bearing against the shoulder 9 so as to retain an electric bulb 15 disposed in its end in spaced relation from the adjacent walls of the sleeve, said bulb having a contact 16 extending from the lower end of the socket in opposed spaced relation to a similar contact 17 formed on a battery 18 removably retained in the sleeve and connected to the socket by an expansion coil spring 19 to not only form an electrical connection therewith but to retain the aforesaid contacts normally in spaced relation and thereby form an open circuit between the battery and bulb.

Threadedly secured in the lower end of the sleeve is a removable plug 20 or other suitable element adapted to seal the same against entrance of water into the sleeve. Said plug is provided with a small inner bore 21 extending therethrough in axial alignment with a large outer bore 22, the former of which slidably retains a plunger 23 therein while the latter slidably retains a substantially cylindrical head 24 formed on the outer end of the plunger. The inner end of the plunger bears against the bottom of the battery while the outer end of the head extends outwardly of the lower end of the plug and rests on one end of a trigger 25 pivoted at its medial portion to the fin 11 by a pin 26 or other suitable element.

Formed on the trigger adjacent its pivotal point is a stop lug 27 adapted to bear against the fin when the battery is disposed in normal position under the influence of the expansion coil spring.

Secured to the opposite or free end of the trigger is a fishing line L having a hook H and weight W extending downwardly therefrom, so a fish caught on the hook will pull downwardly on the outer end of the trigger and will cause it to rock on its pivot and thereby force the head and plunger thereon upwardly against the battery which, in turn, causes compression of the coil spring until the contacts have touched one another and completed the circuit to light the bulb.

In order to lock the trigger against rocking where the bobber is to be used in the day, a dog 28 is pivotally secured thereto so it can be operated or turned with its free end bearing against the plug as indicated in dotted lines in Fig. 4 of the drawing.

With this invention fully described, it is manifest that a fishing bobber is provided whereby a visible signal will be conveyed to the fisherman both in the day and night when a fish is caught on his fishing line and through the instrumentality of the simple combination of elements constituting the same, operation of the same is positive.

Having thus described my invention, what I claim and desire to protect by Letters Patent is:

A fishing bobber comprising, a transparent buoyant body portion including a sleeve within the body portion, having its lower end open and internally threaded, an annular shoulder formed in the upper portion of the sleeve, a bulb socket removably disposed in the upper end of the sleeve, an electric bulb removably secured in the socket, the upper edge of the socket bearing against the annular shoulder, a contact on the bulb extending below the lower end of the socket, a battery removably disposed below the socket and in alignment therewith, a contact on the battery spacedly opposed to the contact of the bulb, an expansion coil spring electrically connecting the socket to one side of the battery and retaining the contacts in spaced relation, a plug removably screwed into the open end of the sleeve and having aligned small and large bores extending therethrough and a notch formed in its lower surface, a plunger slidably extending through the small bore of the plug with its inner end bearing aginst the bottom of the battery, a head formed on the outer end of the plunger slidably disposed in the large bore of the plug with its outer portion extending outwardly of the lower end of the plug, a trigger pivoted at its medial portion to the lower end of the plug with one end contacting the head of the plunger and the opposite end thereof extending outwardly of the side of the plug, a stop lug formed on the trigger and limiting downward sliding movement of the plunger, a dog pivotally connected to the trigger with its free end adapted to seat in the notch in the plug to render the trigger inactive, a fishing line secured to the outer end of the trigger, a fish hook connected to the fishing line, and a weight connected to the lower end of the fishing line.

WILFRID L. BURKE.

REFERENCES CITED

The following references are of record in the file of this patent:

UNITED STATES PATENTS

| Number | Name | Date |
| --- | --- | --- |
| 2,001,109 | Petrie | May 14, 1935 |
| 2,088,201 | Goertzen | July 27, 1937 |
| 2,104,340 | Carmody | Jan. 4, 1938 |
| 2,217,565 | Seigle | Oct. 8, 1940 |
| 2,252,358 | Tosi | Aug. 12, 1941 |
| 2,331,665 | Douglas | Oct. 12, 1943 |
| 2,409,988 | Schwebs | Oct. 22, 1946 |